(12) United States Patent
Yamaguchi et al.

(10) Patent No.: US 11,803,613 B2
(45) Date of Patent: Oct. 31, 2023

(54) INFORMATION PROCESSING DEVICE, INFORMATION PROCESSING METHOD, AND RECORDING MEDIUM

(71) Applicant: KABUSHIKI KAISHA TOSHIBA, Tokyo (JP)

(72) Inventors: Akihiro Yamaguchi, Kita (JP); Shigeru Maya, Yokohama (JP); Ken Ueno, Tachikawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 522 days.

(21) Appl. No.: 17/015,917

(22) Filed: Sep. 9, 2020

(65) Prior Publication Data
US 2021/0295038 A1 Sep. 23, 2021

(30) Foreign Application Priority Data
Mar. 19, 2020 (JP) ................. 2020-049966

(51) Int. Cl.
*G06F 11/00* (2006.01)
*G06F 18/00* (2023.01)
(Continued)

(52) U.S. Cl.
CPC ............ *G06F 18/00* (2023.01); *G06F 18/217* (2023.01); *G06F 18/24* (2023.01); *G06F 18/285* (2023.01);
(Continued)

(58) Field of Classification Search
CPC .. G06K 9/00516; G06K 9/0053; G06F 18/24; G06F 18/285; G06F 18/217;
(Continued)

(56) References Cited

U.S. PATENT DOCUMENTS

2016/0106332 A1\* 4/2016 Takeshima ............. A61B 5/366
600/509
2017/0227584 A1\* 8/2017 Suehiro .................. G06F 17/18
(Continued)

FOREIGN PATENT DOCUMENTS

JP 2017-138929 A 8/2017
JP 2018-205994 A 12/2018
(Continued)

OTHER PUBLICATIONS

Josif Grabocka, et al., "Learning Time-Series Shapelets", KDD '14 Proceedings of the 20th ACM SIGKDD International Conference On Knowledge Discovery And Data Mining, 2014, 10 pages.
(Continued)

*Primary Examiner* — Jeffrey P Aiello
(74) *Attorney, Agent, or Firm* — Oblon, McClelland, Maier & Neustadt, L.L.P.

(57) ABSTRACT

An information processing device includes processing circuitry configured to classify a plurality of partial waveform patterns that characterize a plurality of time series data into a plurality of classes based on the plurality of time series data classified into the plurality of classes, update shapes of the partial waveform patterns by fitting the partial waveform patterns to the time series data of the corresponding class, and reclassify the plurality of time series data into the plurality of classes based on the updated partial waveform patterns and difficulty levels that represent degrees of difficulty of classification and interpretation of the time series data.

20 Claims, 12 Drawing Sheets

(51) Int. Cl.
  *G06F 18/24*     (2023.01)
  *G06F 18/21*     (2023.01)
  *G06F 18/20*     (2023.01)
(52) U.S. Cl.
  CPC ...... *G06F 2218/06* (2023.01); *G06F 2218/10* (2023.01)
(58) Field of Classification Search
  CPC .. G06F 2218/12; G06F 2218/00; G06F 17/18; G06F 16/285; G06F 16/2477; G06F 2218/10; G06F 18/214; G06N 20/00
  USPC ....... 702/70, 66, 71–73, 127, 176, 187–189; 706/12, 15, 20–22, 45–48, 58
  See application file for complete search history.

(56) References Cited

U.S. PATENT DOCUMENTS

| | | | | |
|---|---|---|---|---|
| 2018/0349320 | A1* | 12/2018 | Yamaguchi | G06N 20/00 |
| 2020/0029846 | A1* | 1/2020 | Takayanagi | A61B 5/7264 |
| 2022/0373522 | A1* | 11/2022 | Kanazawa | H01J 49/26 |

FOREIGN PATENT DOCUMENTS

| | | | | | |
|---|---|---|---|---|---|
| KR | 20200052424 | A | * | 10/2018 | ............. G06F 16/00 |
| WO | WO-2013051101 | A1 | * | 4/2013 | ......... G05B 23/0221 |
| WO | WO-2020049267 | A1 | * | 3/2020 | ......... A61B 5/02405 |

OTHER PUBLICATIONS

Hai Li, et al., "Self-paced Convolutional Neural Networks", IJCAI '17 Proceedings of the Twenty-Sixth International Joint Conference on Artificial Intelligence, 2017, pp. 2110-2116.

Josif Grabocka, et al., "Learning Time-Series Shapelets", KDD 'Proceedings of the 20th ACM SIGKDD International Conference On Knowledge Discovery And Data Mining, 2014, 10 pages.

Hao, Li, et al., "Self-paced Convolutional Neural Networks", IJCAI '17 Proceedings of the Twenty-Sixth International Joint Conference on Artificial Intelligence, 2017, pp. 2110-2116.

* cited by examiner

INFORMATION PROCESSING DEVICE, INFORMATION PROCESSING METHOD, AND RECORDING MEDIUM

CROSS REFERENCE TO RELATED APPLICATIONS

This application is based upon and claims the benefit of priority from the prior Japanese Patent Application No. 2020-49966, filed on Mar. 19, 2019, the entire contents of which are incorporated herein by reference.

FIELD

An embodiment of the present invention relates to an information processing device, an information processing method, and a recording medium.

BACKGROUND

In class classification of time series data such as sensor data, it is necessary to clarify the basis of classification in addition to classification performance. As a time series class classification technique for clarifying the basis of classification, a shapelet learning method for simultaneously learning shapelets, which are a small number of partial waveform patterns effective for classification, has been actively studied in addition to a classifier.

On the other hand, since labeling of classes required for learning is often inputted/decided by a human, mislabeling may occur. Moreover, there is a problem that even an expert may have difficulty in accurate labeling itself depending on a time series sample due to the influence of noise or the like.

DETAILED DESCRIPTION

Figure 1:
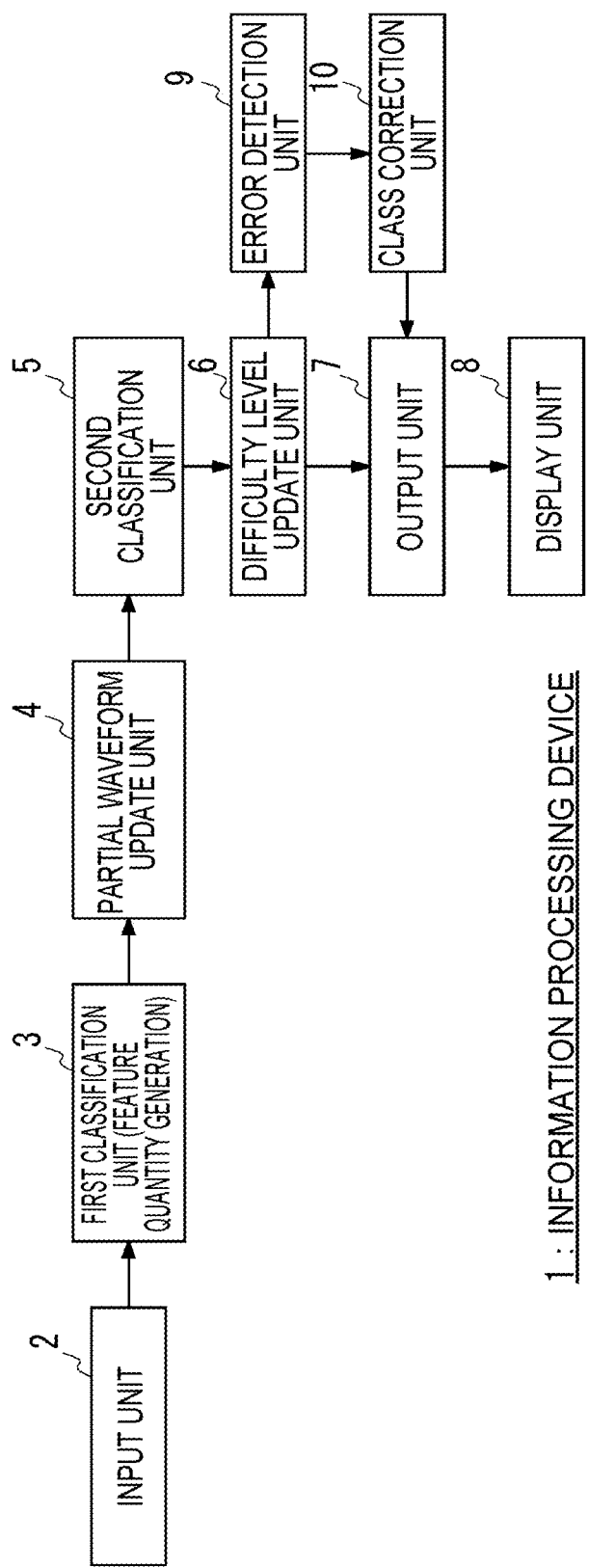
FIG. 1 is a block diagram illustrating a schematic configuration of an information processing device according to a first embodiment.

According to one embodiment, an information processing device includes processing circuitry configured to classify a plurality of partial waveform patterns that characterize a plurality of time series data into a plurality of classes based on the plurality of time series data classified into the plurality of classes;

update shapes of the partial waveform patterns by fitting the partial waveform patterns to the time series data of the corresponding class; and reclassify the plurality of time series data into the plurality of classes based on the updated partial waveform patterns and difficulty levels that represent degrees of difficulty of classification and interpretation of the time series data.

Hereinafter, embodiments of an information processing device will be described with reference to the drawings. Although main components of an information processing device will be mainly described in the following, an information processing device may have components or functions not shown or not described. The following description does not exclude components or functions not shown or not described.

First Embodiment

The following description treats a case where a time series data set is given as T, the number of time series data is given as I, the length of each time series data is given as Q, the number of shapelets that are partial waveform patterns is given as K, and the length of each shapelet is given as L. A shapelet is a typical partial waveform pattern included in time series data. Time series data is, for example, output data from various sensors. Time series data is a data string of a continuous value having a waveform shape that can be arbitrarily changed. A shapelet does not have to match a partial row of individual time series data.

In this embodiment, individual time series data is classified into a plurality of classes. In the following, in order to simplify the description, an example of classification into two classes, that is, a normal class and an abnormal class will be mainly described. It is to be noted that classification into three or more classes may be actually employed. In the present specification, classification into classes is referred to as labeling. A label is information for identifying a class. Moreover, in the present specification, time series data to be inputted may be referred to as a sample.

Although it is assumed in the following discussion that the lengths of the time series data are the same and the lengths of the shapelets are the same in order to simplify the description, this embodiment can be similarly applied even when the lengths of the shapelets are different. Moreover, the time series data is acquired by sampling at equal intervals, and it is assumed that there is no loss.

In addition to these variables, in this embodiment, the classification & interpretation difficulty level of I samples is represented as V, a set of shapelets that fit with time series data of a positive example is represented as K+, and a set of shapelets that fit with time series data of a negative example is represented as K−. The classification & interpretation difficulty level means a difficulty level that represents the difficulty of classification and interpretation of time series data. The classification & interpretation difficulty level is determined in consideration of classification performance and interpretation performance of time series data. Time series data of a positive example refers to time series data that is determined to be normal. Time series data of a negative example refers to time series data that is determined to be abnormal.

An information processing device according to this embodiment can find the weight w of a classification boundary, the shape S of the shapelets that are partial waveform patterns, the classification & interpretation difficulty level V of the sample, the set K+ of shapelets that fit with time series data of a positive example, and the set K− of shapelets that fit with time series data of a negative example. The classification boundary refers to a boundary line that distinguishes between normal and abnormal time series data arranged in a two-dimensional space, for example.

It is to be noted that the weight w of the classification boundary is a K-dimensional vector, the bias term is omitted for simplification, S is a K×L matrix, and the time series data set is an I×Q matrix. V is an I-dimensional vector.

FIG. 1 is a block diagram illustrating a schematic configuration of an information processing device 1 according to the first embodiment. The information processing device 1 in FIG. 1 includes an input unit 2, a first classification unit 3, a partial waveform update unit 4, a second classification unit 5, and a difficulty level update unit 6.

The input unit 2 inputs a learning time series data set with a class label. Here, the number and the length of shapelets may be added to the input, or if not added, the number K of shapelets may be set to 100 and the length L of shapelets may be set to Q×0.1 or the like as default values. In addition, the input unit 2 initializes the matrix S and the weight w described above. For example, the weight w is initialized to zero for all elements. The matrix S is initialized by extracting a segment of length L from the time series data set and performing clustering by a k-means method or the like. As a result, the centroid of K clusters is initialized to S. Moreover, as a waveform pattern fitting condition, some or all of the shapelets can be assigned to a specific class label as follows. For example, one or more shapelets may be assigned as the number of shapelets that fit with a positive example (time series data of a normal class). Moreover, zero or more shapelets may be assigned as the number of shapelets that fit with a negative example (time series data of an abnormal class).

The first classification unit 3 in the information processing device 1 in FIG. 1 classifies shapelets, which are a plurality of partial waveform patterns, into a plurality of classes based on a plurality of time series data classified into a plurality of classes. For example, the first classification unit 3 classifies a plurality of time series data into two classes, that is, normal and abnormal. Although the present specification illustrates an example of classification into two classes, it is to be noted that classification into three or more classes may be employed.

The first classification unit 3 has a feature quantity generation function. The feature quantity generation function is to calculate a K-dimensional (K is an integer of 2 or more) feature vector for classified time series data. An element of each feature vector is the distance between shapelets, which are K partial waveform patterns, and time series data.

The partial waveform update unit 4 updates the partial waveform pattern by fitting shapelets, which are partial waveforms pattern, to time series data of the same class. The time length of a partial waveform pattern is shorter than the time length of time series data. The partial waveform update unit 4 compares the waveform shape of the partial waveform pattern with the waveform shape of the time series data while shifting the partial waveform pattern in the time axis direction of the time series data and, when a partial waveform part of time series data most similar to the partial waveform pattern is found, changes the waveform shape of the partial waveform pattern according to the waveform shape of the partial waveform part. The partial waveform update unit 4 updates the shape of the shapelets, which are partial waveform patterns, by performing fitting with partial waveform patterns by prioritizing time series data with low loss during class classification and a low classification & interpretation difficulty level. Here, the loss during class classification refers to the possibility of making a mistake in class classification.

The second classification unit 5 reclassifies a plurality of time series data into a plurality of classes based on the partial waveform pattern updated by the partial waveform update unit 4 and the classification & interpretation difficulty level. Here, reclassification is performed by prioritizing time series data with low loss during class classification and a low classification & interpretation difficulty level. Time series data having a low classification & interpretation difficulty level refers to time series data having excellent classification performance and/or excellent interpretation performance.

The difficulty level update unit 6 calculates the difficulty level of classification and interpretation of time series data based on the result of reclassification by the second classification unit 5. Here, the loss during class classification is small, and the classification & interpretation difficulty level of time series data that is excellent in fitting with the partial waveform patterns (shapelets) assigned to the same class is reduced.

The processes of the first classification unit 3, the partial waveform update unit 4, the second classification unit 5, and the difficulty level update unit 6 in FIG. 1 are repeatedly executed a predetermined number of times to learn the shape of the partial waveform pattern and to learn the position of the classification boundary for classification into a plurality of classes. The second classification unit 5 reclassifies a plurality of time series data into a plurality of classes based on the updated partial waveform pattern and the difficulty level calculated by the difficulty level update unit 6. By repeatedly executing the processes of the partial waveform update unit 4, the second classification unit 5, and the difficulty level update unit 6 in such a way, the waveform shapes of a plurality of partial waveform patterns (shapelets) can be fitted more to a plurality of time series data, and a plurality of time series data can be accurately classified into a plurality of classes.

Figure 2:
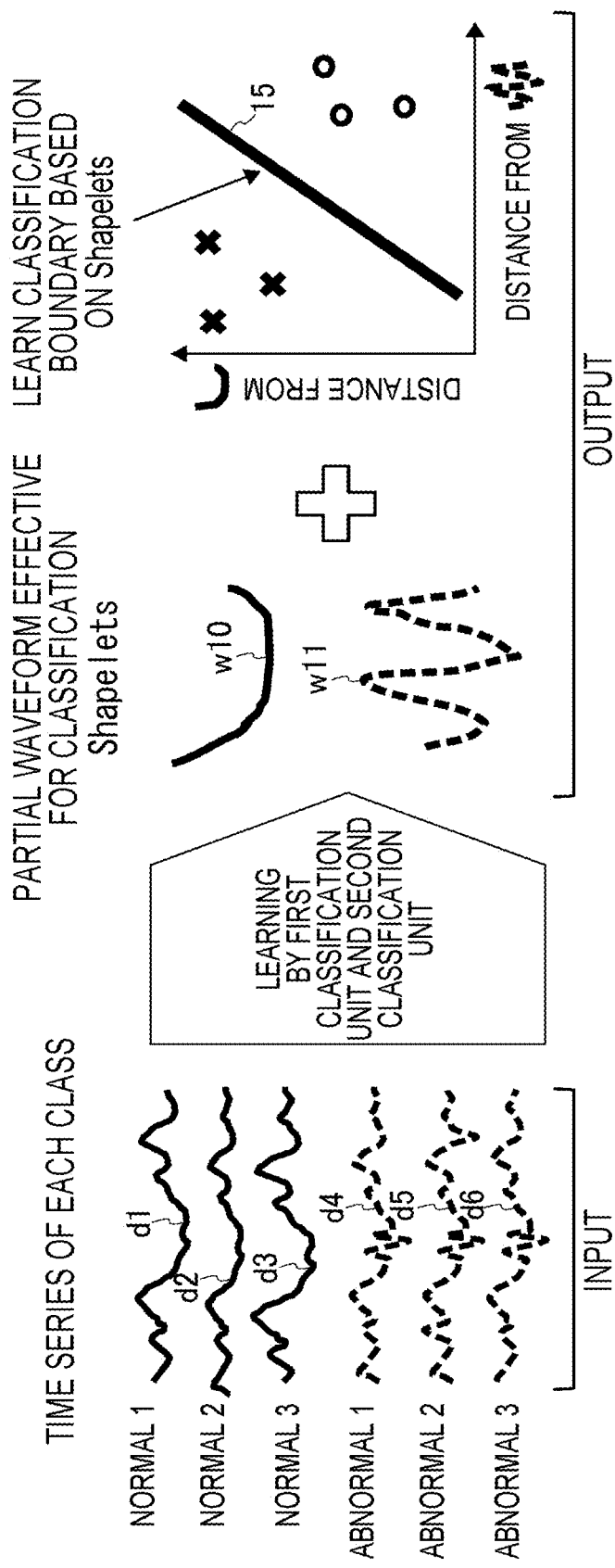
FIG. 2 is a diagram for schematically explaining learning of the shape of shapelets, and a learning method of class classification for each time series data.

FIG. 2 is a diagram schematically illustrating learning of the shape of shapelets (partial waveform patterns) and a learning method of class classification of each time series data. In the example of FIG. 2, normal time series data dl to d3 and abnormal time series data d4 to d6 are inputted, a shapelet w10 of a positive example is detected from normal time series data dl to d3, a shapelet w11 of a negative example is detected from abnormal time series data d4 to d6, and each time series data dl to d6 is plotted on a two-dimensional space according to the distance between these shapelets and each time series data dl to d6. The horizontal axis of the two-dimensional space represents the distance of each time series data from the shapelet w11 of a negative example, and the vertical axis represents the distance of each time series data from the shapelet w10 of a positive example.

In the two-dimensional space, there are circle plots representing normal and cross plots representing abnormal. Circle plots often exist in a region near the lower right of the two-dimensional space, while cross plots often exist in a region near the upper left of the two-dimensional space. The first classification unit 3 and the second classification unit 5 learn a classification boundary 15 that divides these two regions.

Figure 3:
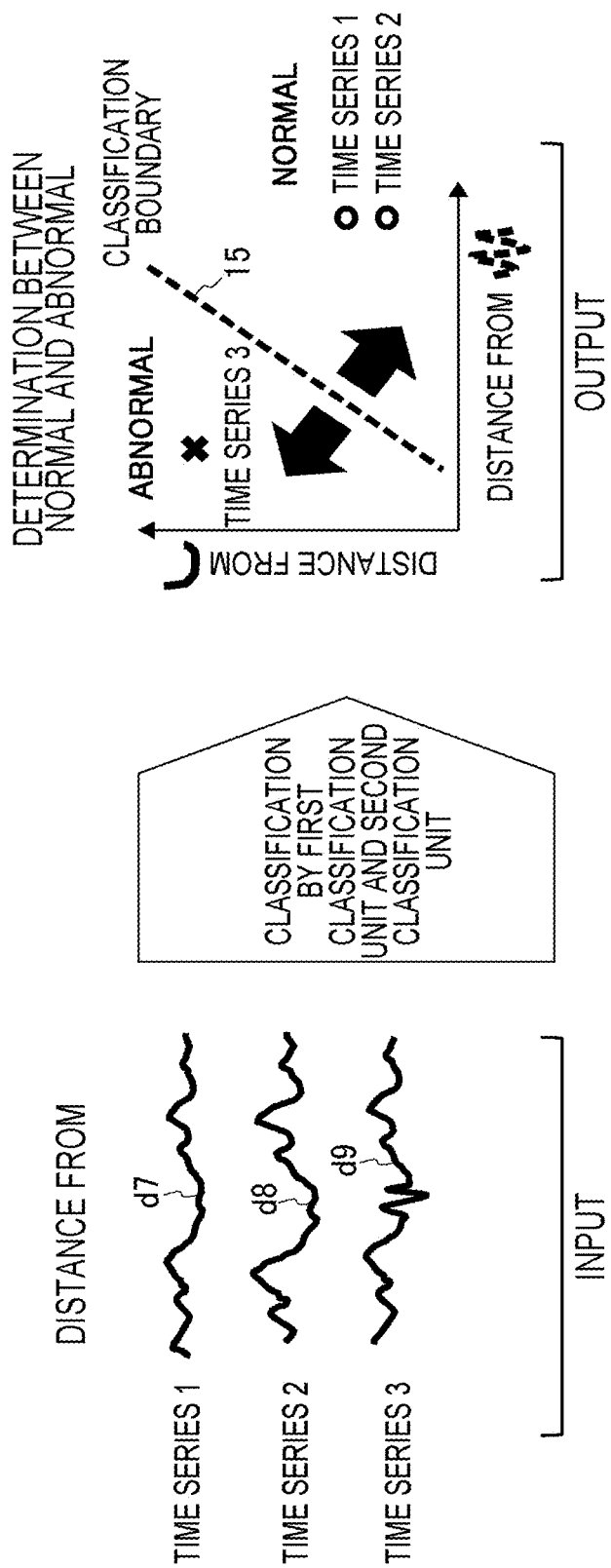
FIG. 3 is a diagram illustrating class classification for new time series data.

After learning by the first classification unit 3 and the second classification unit 5 is finished, it is possible to easily classify the time series data d7 and d8 into a normal class and the time series data d9 into an abnormal class by using the first classification unit 3 and the second learning unit that have performed learning, when the new time series data d7 to d9 as illustrated in FIG. 3 is inputted.

The information processing device 1 in FIG. 1 may include an output unit 7. The output unit 7 outputs information indicating the similarity between time series data and a plurality of partial waveform patterns, and the difficulty level corresponding to the time series data. The partial waveform update unit 4 can repeat the process of calculating the distances from a plurality of partial waveform patterns while shifting the time series data in the time axis direction, and define the minimum distance as the similarity.

The information processing device 1 in FIG. 1 may include a display unit 8. The display unit 8 can display a plurality of indexes (e.g., plots) that include a corresponding classification & interpretation difficulty level in addition to information indicating the similarity between each of a plurality of time series data outputted from the output unit 7 and a plurality of partial waveform patterns, and display boundary information for classifying a plurality of indexes into a plurality of classes. An index is, for example, a plot.

The information processing device 1 in FIG. 1 may include an error detection unit 9. The error detection unit 9 detects an error in classification of a plurality of time series data based on the classification & interpretation difficulty level. The higher the classification & interpretation difficulty level is, the more difficult it is to classify and interpret time series data, and a higher possibility there is that the time series data has been classified into a wrong class. Therefore, the error detection unit 9 determines that an error occurs in classification for time series data having a high classification & interpretation difficulty level. The error detection unit 9 may output information of time series data for which an error in classification has been detected, or may display the information on the display unit 8.

The information processing device 1 in FIG. 1 may include a class correction unit 10. The class correction unit 10 automatically corrects the class of time series data for which an error has been detected by the error detection unit 9. Labeling, which is class classification of time series data, is often performed by a worker, and the labeling accuracy varies depending on the skill level of the worker. Therefore, if the class correction unit 10 is provided to automatically correct a class, the class classification can be performed with a certain accuracy regardless of the skill level of the worker.

The input unit 2 in the information processing device 1 in FIG. 1 may input information on the learning pace. As described above, the accuracy of update of the partial waveform pattern or reclassification of the time series data can be improved by repeating learning. It is effective to perform learning in multiple stages. The input unit 2 may input information on the learning pace in which the number of time series data to be inputted is increased in stages over a plurality of times. For example, in the learning pace, the number of time series data to be inputted may be increased in stages at the beginning, middle, and end of learning. Alternatively, a fixed number of time series data may be inputted at any of the beginning, middle, and end of learning.

The input unit 2 in the information processing device 1 in FIG. 1 may input a condition of a classification & interpretation difficulty level. For example, since the stability of the information processing device 1 is different between before and after the maintenance/inspection work of the information processing device 1, information for setting the classification & interpretation difficulty level lower than that before the maintenance/inspection work may be inputted after the maintenance/inspection work. The difficulty level update unit 6 calculates the difficulty level based on the result of reclassification by the second classification unit 5 and the condition of the difficulty level inputted from the input unit 2.

The input unit 2 in the information processing device 1 in FIG. 1 may input weight information indicating which of the classification performance and the interpretation performance is to be emphasized to what extent. The second classification unit 5 may reclassify a plurality of time series data into a plurality of classes based on the partial waveform pattern updated by the partial waveform update unit 4 and the weight information.

The input unit 2 in the information processing device 1 in FIG. 1 may input the fitting condition of the partial waveform pattern. The partial waveform update unit 4 can update the partial waveform pattern based on the specified condition for a partial waveform pattern for which a fitting condition is specified, and update the partial waveform pattern based on best fitted time series data for a partial waveform pattern for which a fitting condition is not specified.

The input unit 2 in the information processing device 1 in FIG. 1 may input at least one condition of the minimum number and the maximum number of partial waveform patterns that can be classified into a specific class. The first classification unit 3 can assign partial waveform patterns, the number of which satisfies the condition inputted into the input unit 2, to a specific class.

Figure 4:
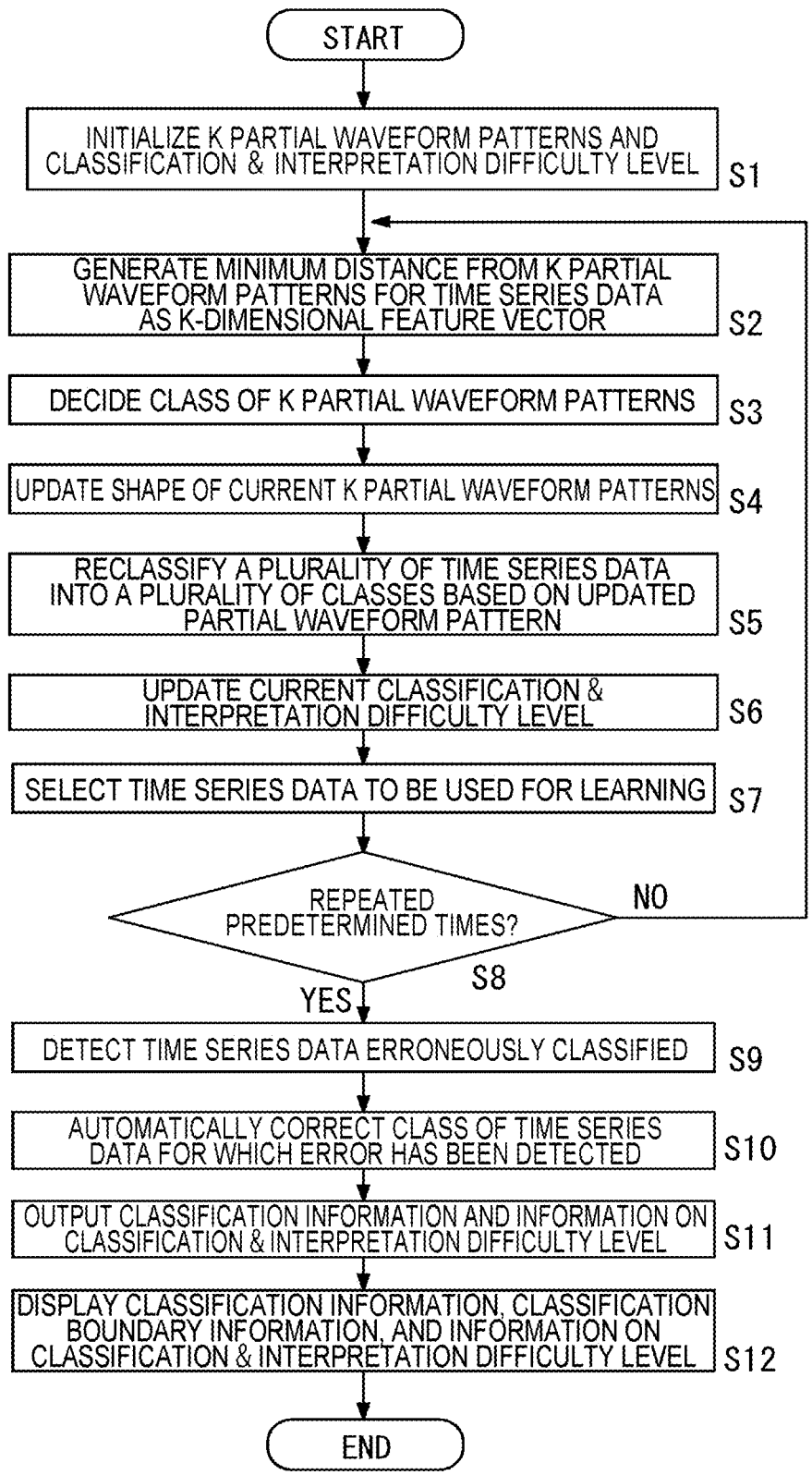
FIG. 4 is a flowchart illustrating the processing operation of the information processing device according to the first embodiment.

FIG. 4 is a flowchart illustrating the processing operation of the information processing device 1 according to the first embodiment. First, K (e.g., K is an integer of 1 or more) partial waveform patterns are initialized, and the classification & interpretation difficulty level is also initialized (step S1). In this step S1, initial patterns preliminarily prepared are selected as K partial waveform patterns. These partial waveform patterns are referred to as shapelets.

Next, the current K partial waveform patterns are assigned to each class (steps S2 and S3). When the number of partial waveform patterns of each class is decided by the fitting condition, partial waveform patterns up to that number are fitted to time series data to decide the class of each partial waveform pattern. More specifically, the distance between the partial waveform pattern and the time series data is calculated while moving the partial waveform pattern along the time axis of the time series data, and the minimum distance from the K partial waveform patterns to the time series data is generated as a K-dimensional feature vector (step S2). Next, the class of K partial waveform patterns having the minimum distance is decided (step S3). The processes of steps S2 and S3 are performed by the first classification unit 3 in FIG. 1.

Next, the shapes of the current K partial waveform patterns are updated (step S4). This process is performed by the partial waveform update unit 4. In this process, the shape of the partial waveform pattern is updated so that the partial waveform pattern is fitted to the time series data assigned to the same class such that the loss in class classification is reduced and time series data with a low classification & interpretation difficulty level is prioritized. A gradient method may be used to update the shape of the partial waveform pattern.

Next, a plurality of time series data are reclassified into the plurality of classes based on the updated partial waveform pattern (step S5). This process is performed by the second classification unit 5. In this process, reclassification into a plurality of classes is performed by prioritizing time series data with reduced loss in class classification and a low classification & interpretation difficulty level. When using a linear classifier, the weight is updated. A gradient method may be used to update the weight.

Next, the current classification & interpretation difficulty level is updated (step S6). This process is performed by the difficulty level update unit 6. In this process, the classification & interpretation difficulty level is updated so that the loss in class classification is reduced and the time series data assigned to the same class and the partial waveform pattern are fitted more.

Next, time series data used for learning is selected so that time series data having a higher classification & interpretation difficulty level is learned in stages according to the learning pace inputted into the input unit 2 (step S7).

Next, whether the processes of steps S2 to S7 have been repeated a preset number of times or not is determined (step S8).

If the predetermined number of times has not been reached yet, the processes of steps S2 to S7 are repeated. If the predetermined number of times has been reached, time series data erroneously classified is detected (step S9). This process is performed by the error detection unit 9. Next, the class of the time series data for which an error has been detected is automatically corrected (step S10). This process is performed by the class correction unit 10.

Next, the classification information of time series data after learning and class correction, and the information on the classification & interpretation difficulty level of each time series data are outputted (step S11). This process is performed by the output unit 7. Next, a plurality of indexes that represent a corresponding difficulty level in addition to information indicating the similarity between each of a plurality of time series data outputted from the output unit 7 and a plurality of partial waveform patterns is displayed, and the classification boundary 15 for classifying a plurality of indexes into a plurality of classes is displayed (step S12).

Figure 5:
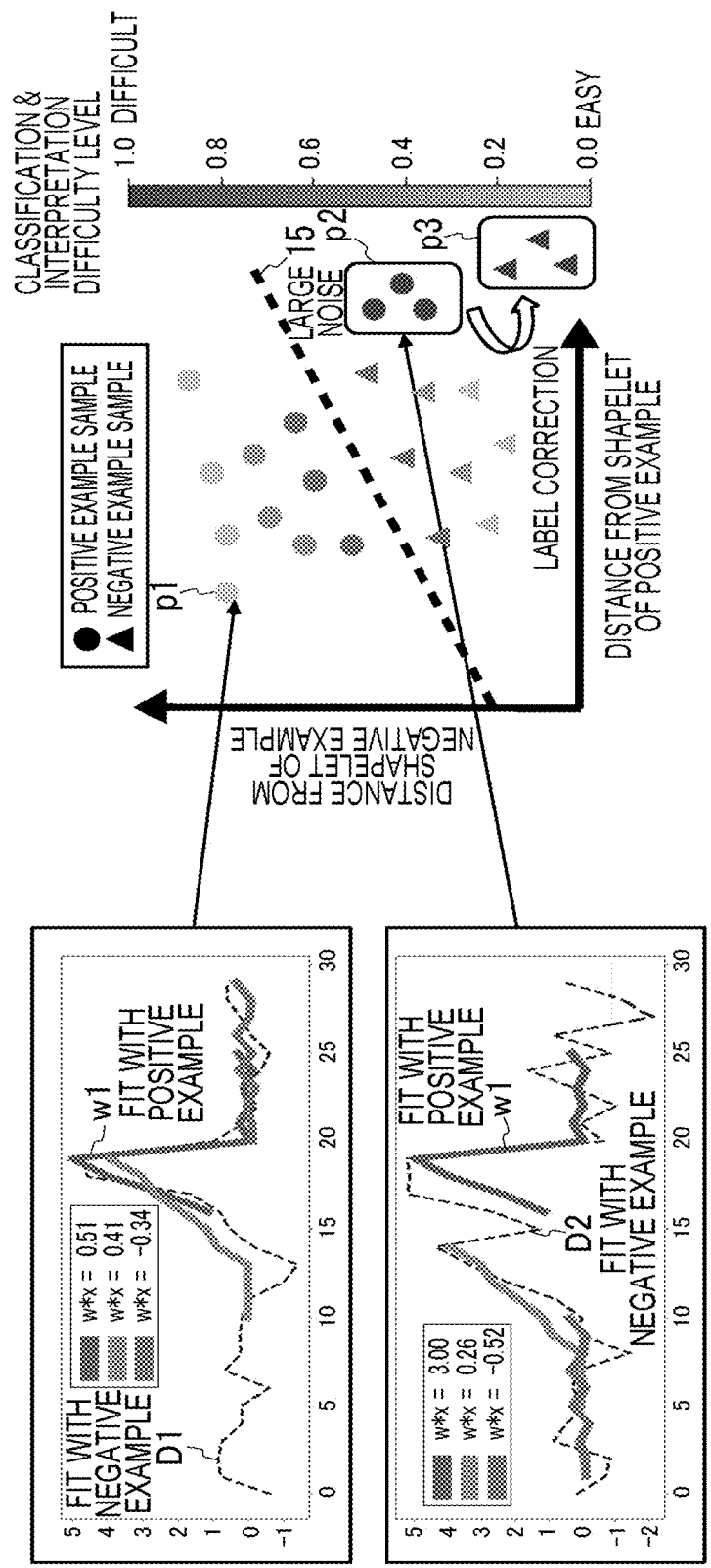
FIG. 5 is a diagram illustrating a specific example to be displayed on a display unit.

FIG. 5 is a diagram illustrating a specific example to be displayed on the display unit 8. The horizontal axis of the two-dimensional space in FIG. 5 indicates the distance of each time series data from a shapelet of a positive example, and the vertical axis indicates the distance of each time series data from a shapelet of a negative example. In FIG. 5, plots classified into the normal class are circular, and plots classified into the abnormal class are triangular. It is to be noted that the shape of each plot is arbitrary. Each plot is disposed at a position according to the similarity between each time series data and a partial waveform pattern. Moreover, each plot is displayed in a color or a degree of shading according to the classification & interpretation difficulty level. Furthermore, the classification boundary 15 for classifying normal and abnormal is displayed.

As a result, the class of each time series data can be easily identified, and the classification & interpretation difficulty level of each time series data can be visually grasped. FIG. 5 shows that class determination of normal or abnormal can be performed more accurately for time series data located farer from the classification boundary 15. In other words, it is shown that time series data located nearer to the classification boundary 15 has a higher possibility of erroneous class determination of normal or abnormal.

The left side of FIG. 5 shows the characteristics of two time series data D1 and D2. The time series data D1 has a partial waveform that fits with a partial waveform pattern w1 of the normal class. Therefore, the time series data D1 is associated with a plot p1 in the two-dimensional space and classified into the normal class. On the other hand, the time series data D2 does not have a partial waveform that fits with the partial waveform pattern w1 of the normal class. For this reason, the time series data D2 should be associated with the plot p2 in the two-dimensional space and classified into the abnormal class originally. However, as a result of being erroneously classified, the time series data D2 is associated with the circular plot p2 that means a normal class. Therefore, the error detection unit 9 detects the plot p2 erroneously classified from the plurality of plots displayed on the display unit 8, and the class correction unit 10 automatically corrects the plot p2 into a plot p3 of the correct class. It is to be noted that, instead of the automatic correction, the class detected by the error detection unit 9 may be highlighted or the like so as cause the worker to manually perform correction.

As a criterion for the class correction unit 10 to determine whether to correct the class or not, for example, whether the classification & interpretation difficulty level is 0.8 or more or not may be employed. Alternatively, whether the distance between the time series data and the partial waveform pattern, that is, a fitting error is 0.5 or more or not may be employed.

As described above, in the first embodiment, the shape of the partial waveform pattern is updated by fitting the partial waveform pattern to the time series data, and a plurality of time series data are reclassified into a plurality of classes based on the classification and interpretation difficulty level of the updated partial waveform pattern and time series data. This makes it possible to accurately classify a plurality of time series data into a plurality of classes. Moreover, even if a plurality of time series data are erroneously classified, it is possible to easily detect the time series data erroneously classified and to automatically perform class correction by plotting each time series data in a multidimensional space according to the number of classes and adding information on the classification & interpretation difficulty level to each plot as illustrated in FIG. 5.

Second Embodiment

The second embodiment is configured to allow the user to specify weight information indicating which of the classification performance and the interpretation performance is to be emphasized to what extent. An information processing device 1 according to the second embodiment includes the same block configuration as that of FIG. 1.

Figure 6A:
FIG. 6A is a diagram illustrating an example of setting to emphasize the classification performance using a slide bar.

An input unit 2 in the information processing device 1 according to the second embodiment causes a display unit 8 to display a slide bar 20 as illustrated in FIG. 6A and allows the user to move the slide bar 20 to an arbitrary position with a mouse or the like.

The slide bar 20 in FIG. 6A emphasizes the classification performance of time series data more on the left side and the interpretation performance more on the right side. Depending on the position of the slide bar 20, weight information indicating which of the classification performance and the interpretation performance is to be emphasized to what extent can be obtained. FIG. 6A illustrates an example in which the slide bar 20 is moved to a position where the classification performance is to be emphasized.

When the classification performance is emphasized as illustrated in FIG. 6A, a partial waveform pattern with high classification performance and a classifier (first classification unit 3 and second classification unit 5) can be learned, though the interpretability is sacrificed because it becomes difficult to fit the partial waveform pattern to typical time series data of a positive example or a negative example.

Figure 6B:
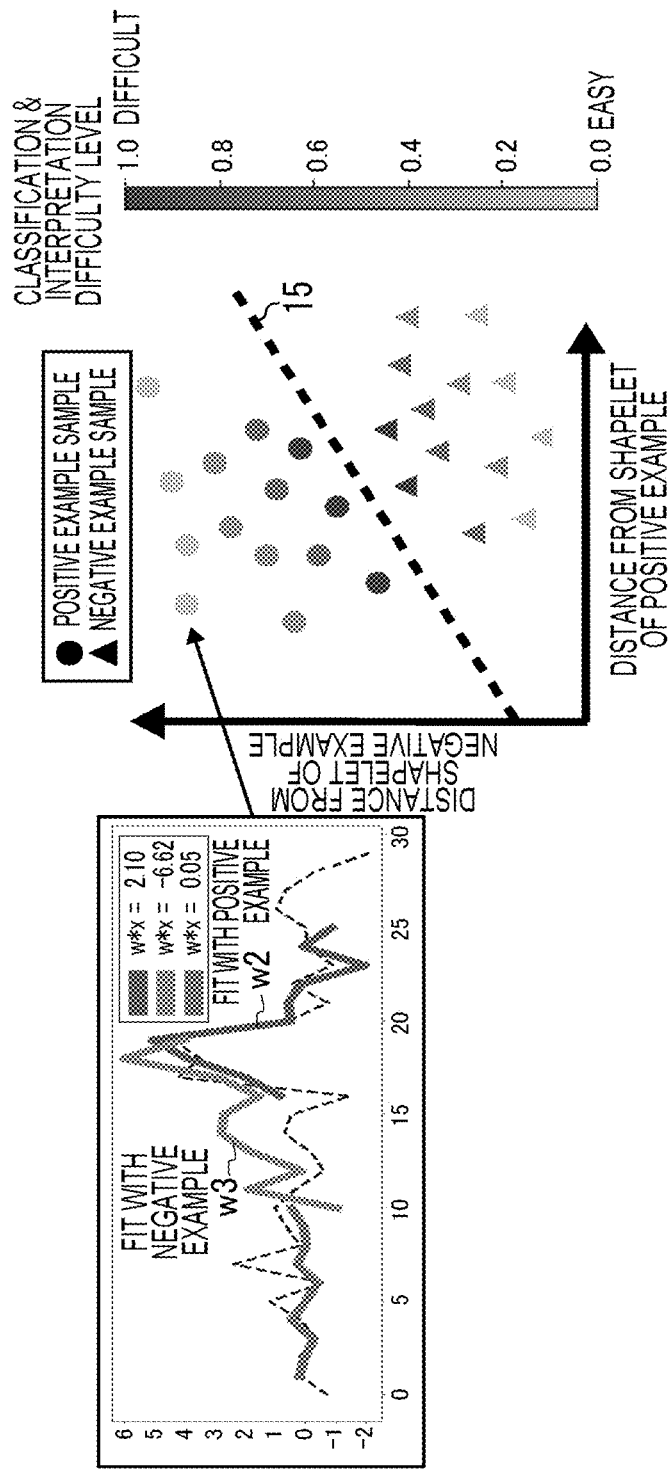
FIG. 6B is a diagram illustrating the shape of shapelets and a class classification result to be obtained when the slide bar is moved to the position of FIG. 6A.

FIG. 6B is a diagram illustrating the shape of shapelets and a class classification result to be obtained when the slide bar 20 is moved to the position of FIG. 6A. When the slide bar 20 is moved to the position of FIG. 6A, since the classification performance is emphasized, the shapelets (partial waveform patterns) w2 and w3 have many critical points, and it becomes difficult to grasp the characteristics of the waveform of the shapelets. However, the plots of positive and negative examples in the two-dimensional space are orderly separated on both sides of a classification boundary 15, and it can be seen that class classification is performed correctly.

Figure 7A:
FIG. 7A is a diagram illustrating an example of setting to emphasize the interpretation performance using the slide bar.

On the other hand, FIG. 7A illustrates an example in which the slide bar 20 is moved to a position where the interpretation performance is emphasized. When the interpretation performance is emphasized as illustrated in FIG. 7A, the classification performance may be deteriorated, though the partial waveform pattern fits with typical time series data of a positive example or a negative example and improves the interpretability.

Figure 7B:
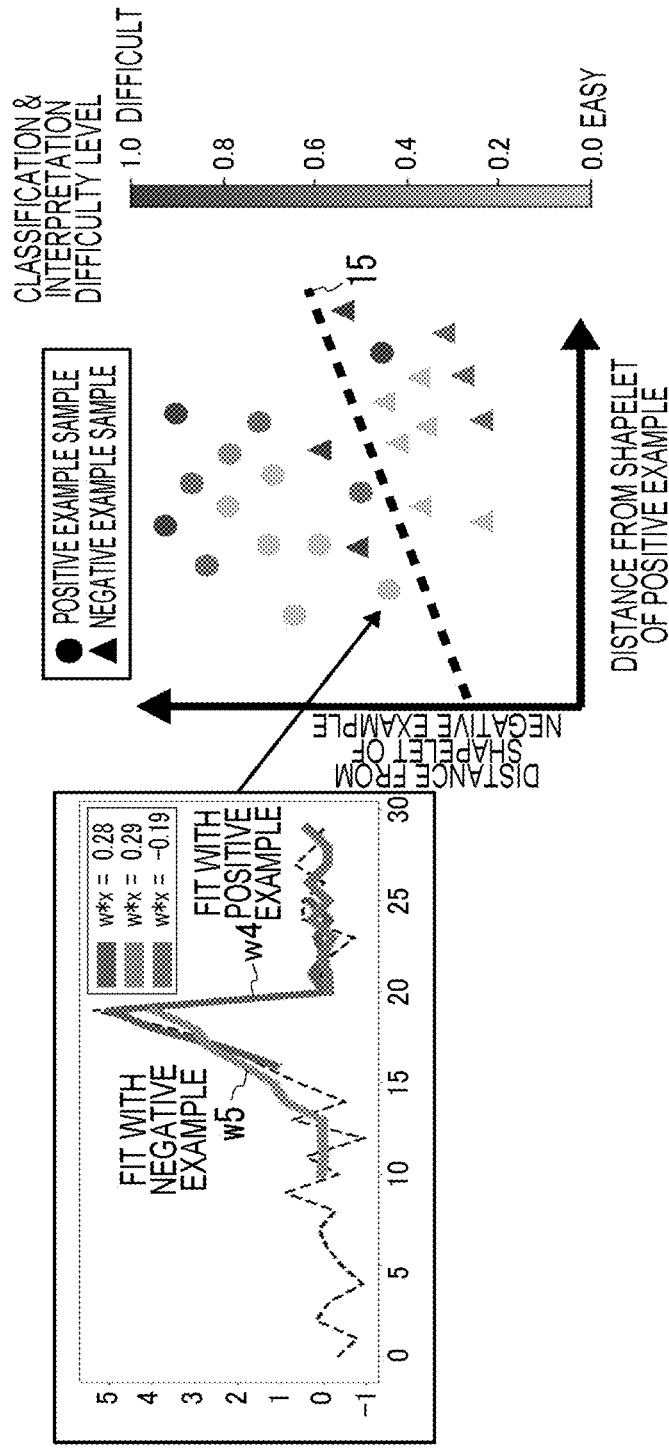
FIG. 7B is a diagram illustrating the shape of shapelets and a class classification result to be obtained when the slide bar is moved to the position of FIG. 7A.

FIG. 7B is a diagram illustrating the shape of shapelets and a class classification result to be obtained when the slide bar 20 is moved to the position of FIG. 7A. When the slide bar 20 is moved to the position of FIG. 7A, since the interpretation performance is emphasized, the shapelets (partial waveform patterns) w4 and w5 have few critical points, and therefore it is easy to grasp the characteristics of the waveform of the shapelets. However, plots of positive and negative examples in the two-dimensional space are partly intermingled on both sides of the classification boundary 15, and it can be seen that class classification may not be performed correctly.

This makes it possible to obtain a partial waveform pattern and class classification proper for business needs such as a case where it is preferable to find a partial waveform pattern that is easy to interpret even if the classification performance is slightly degraded, or conversely, a case where interpretability is almost unnecessary and it is preferable to improve the class classification performance as much as possible.

As described above, in the second embodiment in which the user can arbitrarily set which of the classification performance and the interpretation performance is to be emphasized to what extent, it is possible to facilitate class classification or make it easy to grasp the characteristics of the waveform of the shapelets according to user's intention.

Third Embodiment

The third embodiment is to estimate the skill level of a worker who labels a class, or to assist an unskilled worker in labeling.

Figure 8:
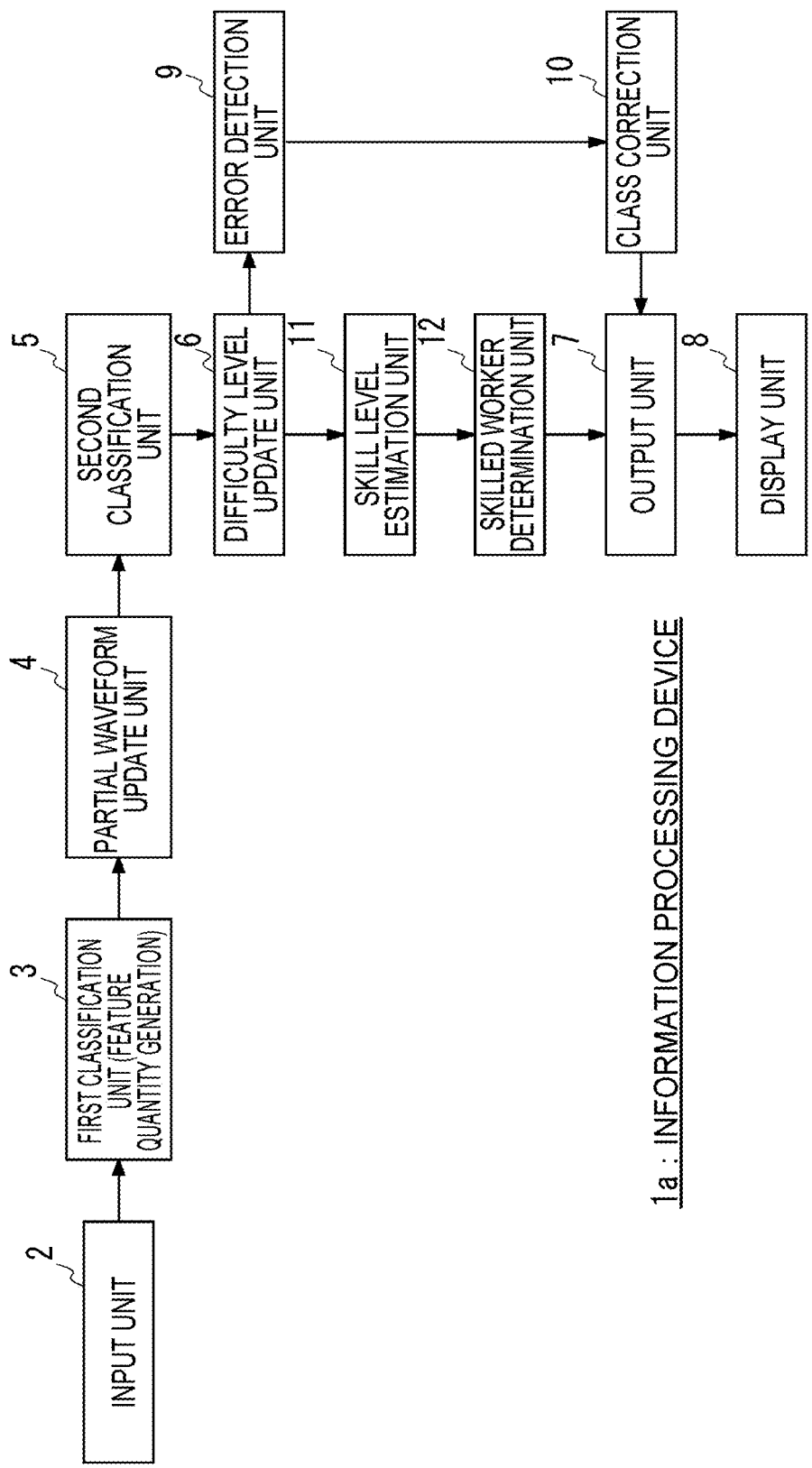
FIG. 8 is a block diagram illustrating a schematic configuration of an information processing device according to a sixth embodiment.

FIG. 8 is a block diagram illustrating a schematic configuration of an information processing device 1a according to the third embodiment. The information processing device 1a in FIG. 8 includes a skill level estimation unit 11 and a skilled worker determination unit 12 in addition to the block configuration of FIG. 1.

Moreover, an input unit 2 in the information processing device 1a in FIG. 8 inputs information on the worker who classifies a plurality of time series data. More specifically, the input unit 2 inputs the information on the worker and time series data labeled by the worker in association with each other.

In this embodiment, it is premised that a plurality of workers randomly select a plurality of time series data and perform labeling (classification). It is assumed that the plurality of workers include a skilled worker and an unskilled worker.

The skill level estimation unit 11 estimates the skill level of a worker regarding labeling based on classification by a second classification unit 5 and a difficulty level calculated by the difficulty level update unit 6. More specifically, for time series data labeled by each worker, a statistical value representing classification by the second classification unit 5 and the classification & interpretation difficulty level is calculated. The statistical value may be an average value. For example, when the classification & interpretation difficulty level of time series data labeled by a specific worker is high, the statistical value of the worker is lowered. It is estimated that a lower statistical value indicates a lower skill level.

The skilled worker determination unit 12 determines whether the worker is a skilled worker or an unskilled worker based on the skill level estimated by the skill level estimation unit 11. Then, a partial waveform pattern learned based on time series data labeled by a skilled worker is presented to an unskilled worker. As a result, an unskilled worker can learn what kind of characteristics of partial waveforms should be focused on for classifying time series data, and can improve the skill level in a short time.

Figure 9:
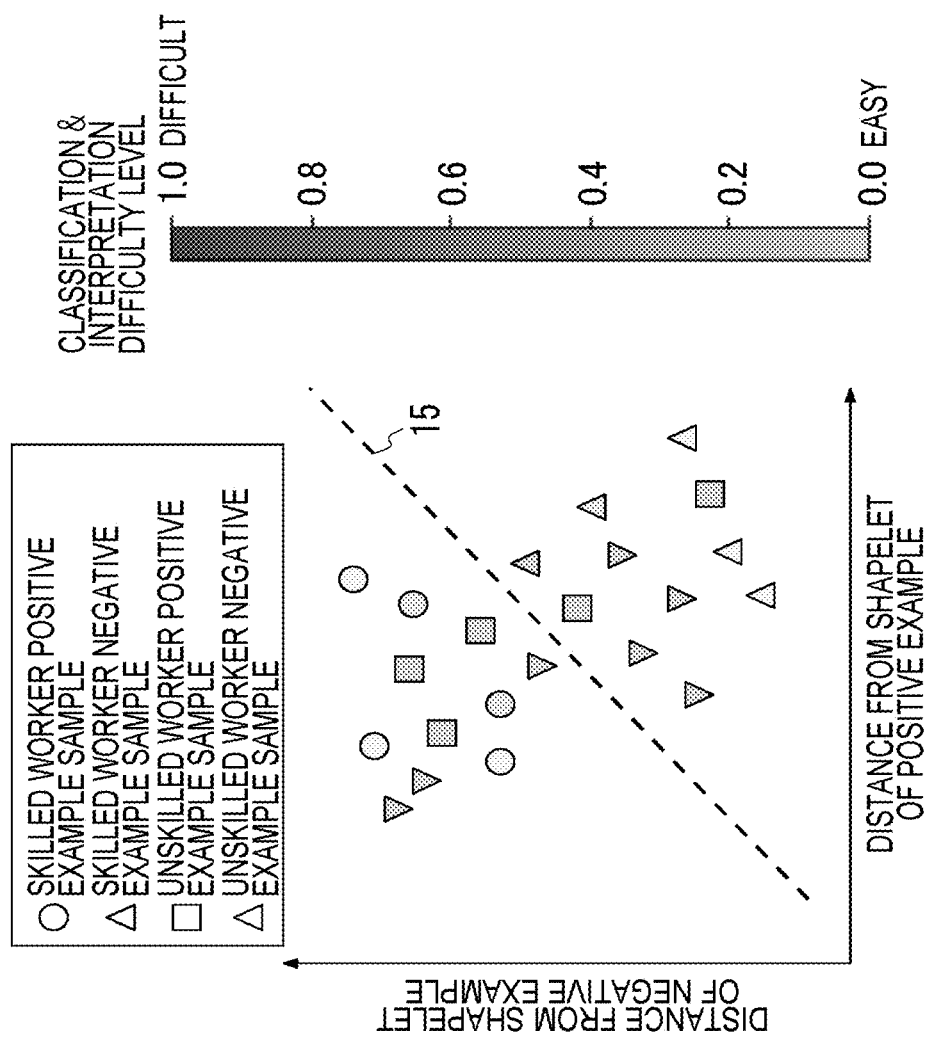
FIG. 9 is a diagram illustrating an example of samples labeled by a skilled worker and an unskilled worker.

FIG. 9 is a diagram illustrating an example of samples labeled by a skilled worker and an unskilled worker. In FIG. 9, samples of each time series data are plotted with the horizontal axis as the distance from a shapelet of a positive example and the vertical axis as the distance from a shapelet of a negative example. In FIG. 9, a positive example sample by a skilled worker is represented by a circle plot, a negative example sample is represented by an upward triangular plot, a positive example sample by an unskilled worker is represented by a square plot, and a negative example sample is represented by a downward triangular plot. Although a plot of a negative example sample should be located below the classification boundary 15 and a plot of a positive example sample should be located above the classification boundary 15, many errors have occurred in the labeling by an unskilled worker.

Figure 10:
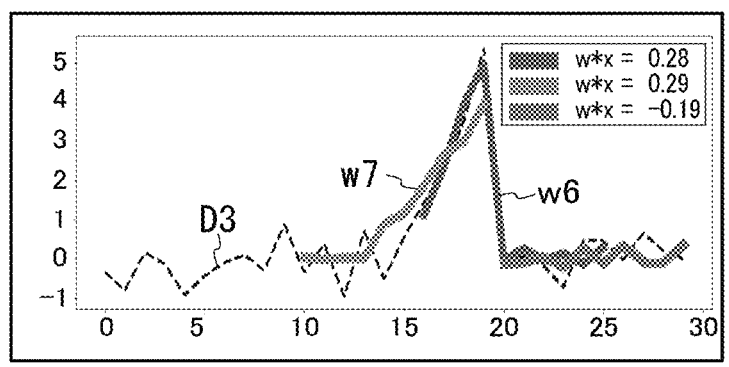
FIG. 10 is a diagram illustrating an example of labeling by a skilled worker.

The skilled worker determination unit 12 can determine the skill level of the worker from the result in FIG. 9. The skilled worker determination unit 12 can educate an unskilled worker by providing the unskilled worker with information on which of time series data (samples) D3 a skilled worker focused on for setting shapelets w6 and w7 and labeling as illustrated in FIG. 10.

As described above, in the third embodiment, the skill level of the worker who classifies the time series data is estimated based on classification by the second classification unit 5 and the classification & interpretation difficulty level, and time series data classified by a skilled worker having a high skill level is presented to an unskilled worker having a low skill level, so that it is possible to cause an unskilled worker to learn the knack of classification, to improve the skill level of an unskilled worker in a short time, and thereby to reduce classification errors.

At least a part of an information processing device 1 or 1a described in the above embodiments may be configured by hardware or software. In the case of software, a program that realizes at least a part of the functions of an information processing device 1 or 1a may be stored in a recording medium such as a flexible disk or a CD-ROM, and be read and executed by a computer. The recording medium is not limited to a removable medium such as a magnetic disk or an optical disk, but may be a fixed recording medium such as a hard disk device or a memory.

Moreover, a program that realizes at least a part of the functions of an information processing device 1 or 1a may be distributed via a communication line (including wireless communication) such as the Internet. Furthermore, the same program may be distributed in a state of being encrypted, modulated, or compressed via a wired line or a wireless line such as the Internet, or in a state of being stored in a recording medium.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An information processing device comprising:
processing circuitry configured to:
classify a plurality of partial waveform patterns that characterize a plurality of time series data into a plurality of classes based on the plurality of time series data classified into the plurality of classes;
update shapes of the partial waveform patterns by fitting the partial waveform patterns to the time series data of the corresponding class; and
reclassify the plurality of time series data into the plurality of classes, by giving a higher priority to the time series data having less difficulty levels, based on the updated partial waveform patterns and difficulty levels that represent degrees of difficulty of classification and interpretation of the time series data.

2. The information processing device according to claim 1, wherein the processing circuitry is further configured to update the difficulty levels of the time series data based on a result of reclassification.

3. The information processing device according to claim 2, wherein
processes of the processing circuitry are repeatedly executed a predetermined number of times, and
the processing circuitry reclassifies the plurality of time series data into the plurality of classes based on the updated partial waveform pattern and the difficulty levels.

4. The information processing device according to claim 2, wherein the processing circuitry is further configured to output information that indicates a similarity between the time series data and the plurality of partial waveform patterns, and the difficulty level corresponding to the time series data.

5. The information processing device according to claim 4, wherein the processing circuitry repeats a process of calculating a distance of the time series data from the plurality of partial waveform patterns while shifting the time series data in a time axis direction and defines a minimum distance as the similarity.

6. The information processing device according to claim 4, wherein the processing circuitry is further configured to:
display a plurality of indexes that include a corresponding difficulty level in addition to information indicating a similarity between each of the outputted plurality of time series data and the plurality of partial waveform patterns, and
display boundary information for classifying the plurality of indexes into the plurality of classes.

7. The information processing device according to claim 2, wherein the processing circuitry is further configured to detect an error in classification of the plurality of time series data based on the difficulty levels.

8. The information processing device according to claim 7, wherein the processing circuitry is further configured to correct a class of time series data that an error has been detected.

9. The information processing device according to claim 2, wherein the processing circuitry is further configured to:
input information on a learning pace in which a number of the time series data to be inputted is increased in stages over a plurality of times,
repeatedly execute a process of reclassifying the plurality of time series data into the plurality of classes according to the learning pace, and
repeatedly execute a process of calculating the difficulty level according to the learning pace.

10. The information processing device according to claim 2, wherein the processing circuitry is further configured to:
input a condition of the difficulty levels, and
calculate the difficulty levels based on a result of reclassification and the condition of the difficulty levels.

11. The information processing device according to claim 2, wherein the processing circuitry is further configured to:
input weight information indicating which of classification performance and interpretation performance is to be emphasized to what extent,
calculate the difficulty levels based on a result of reclassification and the weight information, and
reclassify the plurality of time series data into the plurality of classes based on the updated partial waveform pattern and the weight information.

12. The information processing device according to claim 2, wherein the processing circuitry is further configured to:
input a fitting condition for the partial waveform pattern,
update the partial waveform pattern based on the fitting condition for the partial waveform pattern for which the fitting condition is specified, and
update the partial waveform pattern based on best fitted time series data for the partial waveform pattern for which the fitting condition is not specified.

13. The information processing device according to claim 2, wherein the processing circuitry is further configured to:
input at least one condition of a minimum number and a maximum number of the partial waveform patterns that can be classified into a specific class, and
assign partial waveform patterns, the number of which satisfies the condition, to the specific class.

14. The information processing device according to claim 2, wherein the processing circuitry is further configured to:
input information on a worker who classifies the plurality of time series data, and estimate a skill level of the worker regarding classification based on classification and the difficulty level.

15. The information processing device according to claim 14, wherein the processing circuitry is further configured to determine whether the worker is a skilled worker or an unskilled worker based on the estimated skill level.

16. The information processing device according to claim 15, wherein the processing circuitry is further configured to present to the unskilled worker information on classification of the plurality of partial waveform patterns classified by the skilled worker when determined that the worker is the unskilled worker.

17. The information processing device according to claim 1, wherein the processing circuitry is further configured to:
   display a plurality of indexes that represent a corresponding difficulty level in addition to information indicating a similarity between each of the plurality of time series data and the plurality of partial waveform patterns, and
   display boundary information for classifying the plurality of indexes into the plurality of classes.

18. An information processing method comprising:
   classifying a plurality of partial waveform patterns into a plurality of classes based on a plurality of time series data classified into the plurality of classes;
   updating shapes of the partial waveform patterns by fitting the partial waveform patterns to the time series data of the corresponding class; and
   reclassifying the plurality of time series data into the plurality of classes, by giving a higher priority to the time series data having less difficulty levels, based on the updated partial waveform patterns and difficulty levels that represent degrees of difficulty of classification and interpretation of the time series data.

19. The information processing method according to claim 18, further comprising
   displaying a plurality of indexes that represent a corresponding difficulty level in addition to information indicating a similarity between each of the plurality of time series data and the plurality of partial waveform patterns, and
   displaying boundary information for classifying the plurality of indexes into the plurality of classes.

20. A non-transitory computer readable recording medium storing a program for causing a computer to execute:
   classifying a plurality of partial waveform patterns into a plurality of classes based on a plurality of time series data classified into the plurality of classes;
   updating shapes of the partial waveform patterns by fitting the partial waveform patterns to the time series data of the corresponding class; and
   reclassifying the plurality of time series data into the plurality of classes, by giving a higher priority to the time series data having less difficulty levels, based on the updated partial waveform patterns and difficulty levels that represent degrees of difficulty of classification and interpretation of the time series data.

\* \* \* \* \*